United States Patent
Yutani et al.

(10) Patent No.: US 8,528,388 B2
(45) Date of Patent: Sep. 10, 2013

(54) ENGINE CONTROL SYSTEM

(75) Inventors: Kentaro Yutani, Nukata-gun (JP);
Takanobu Kawano, Oobu (JP);
Yoshiaki Atsumi, Susono (JP); Hiroshi Kanai, Susono (JP); Koji Miwa, Susono (JP)

(73) Assignees: Toyota Jidosha Kabushiki Kaisha, Aichi-ken (JP); Nippon Soken, Inc, Aichi (JP)

( * ) Notice: Subject to any disclaimer, the term of this patent is extended or adjusted under 35 U.S.C. 154(b) by 1148 days.

(21) Appl. No.: 12/354,388

(22) Filed: Jan. 15, 2009

(65) Prior Publication Data

US 2009/0229897 A1 Sep. 17, 2009

(30) Foreign Application Priority Data

Mar. 12, 2008 (JP) .................................. 2008-062903
Oct. 7, 2008 (JP) .................................. 2008-260932

(51) Int. Cl.
*G01M 15/04* (2006.01)

(52) U.S. Cl.
USPC ...................................................... 73/114.15

(58) Field of Classification Search
USPC ...................................................... 73/114.15
See application file for complete search history.

(56) References Cited

U.S. PATENT DOCUMENTS

| | | | |
|---|---|---|---|
| 5,278,760 A | 1/1994 | Ribbens et al. | |
| 5,353,636 A | 10/1994 | Sakurai et al. | |
| 5,771,482 A * | 6/1998 | Rizzoni | 701/101 |
| 7,775,089 B2 * | 8/2010 | Suzuki et al. | 73/114.15 |
| 7,971,474 B2 * | 7/2011 | Suzuki | 73/114.02 |
| 2009/0025467 A1 * | 1/2009 | Suzuki et al. | 73/114.15 |
| 2010/0152991 A1 | 6/2010 | Suzuki | |

FOREIGN PATENT DOCUMENTS

| | | |
|---|---|---|
| JP | 6-58196 A | 3/1994 |
| JP | 6-207551 A | 7/1994 |
| JP | 8-291761 A | 11/1996 |
| JP | 2000-2149 A | 1/2000 |
| JP | 2003328850 A | 11/2003 |
| JP | 2009-029212 A | 2/2009 |
| JP | 2009-062825 A | 3/2009 |
| JP | 2009-281314 A | 12/2009 |
| JP | 2010-014492 A | 1/2010 |
| JP | 2010-089695 A | 4/2010 |
| JP | 2010-106814 A | 5/2010 |
| WO | 2007/072627 A1 | 6/2007 |

* cited by examiner

*Primary Examiner* — Freddie Kirkland, III
(74) *Attorney, Agent, or Firm* — Sughrue Mion, PLLC

(57) ABSTRACT

An engine control system includes an engine that outputs a rotation of a crankshaft through a torsional damper; a calculation portion that calculates a value of engine torque based on an angular acceleration of the crankshaft and a moment of inertia of the crankshaft; and a correction portion that calculates a correction value based on a torsional angle of the torsional damper, and corrects the calculated value of the engine torque using the correction value.

20 Claims, 5 Drawing Sheets

ENGINE CONTROL SYSTEM

INCORPORATION BY REFERENCE

The disclosures of Japanese Patent Applications No. 2008-062903 filed on Mar. 12, 2008 and No. 2008-260932 filed on Oct. 1, 2008 including the specifications, drawings and abstracts are incorporated herein by reference in their entireties.

BACKGROUND OF THE INVENTION

1. Field of the Invention

The invention relates to an engine control system, and in particular, relates to a control system that calculates engine torque in order to control an engine.

2. Description of the Related Art

Generally, as described in Japanese Patent Application Publication No. 8-291761 (JP-A-8-291761), an engine control apparatus has come into practical use in which it is determined whether a combustion state in an engine is good based on information on an angular velocity of a crankshaft, and the determination result is fed back to the engine control. The determination as to whether the combustion state is good may be made based on the angular velocity information, for example, in the manner as described below. First, the engine torque is calculated based on the angular velocity of the crankshaft. In a simple calculation method, the engine torque is calculated by multiplying an angular acceleration of the crankshaft by a moment of inertia of the crankshaft. Thus, it is possible to determine whether the combustion state in the engine is good based on the amount and pattern of fluctuation of the engine torque.

A hybrid vehicle, which includes two types of power sources, an engine and an electric motor, has come into practical use. The hybrid vehicle may be configured so that the crankshaft is operatively connected to a rotor of the electric motor. In this case, the following phenomenon may occur. Because the engine is operated by repeating intermittent combustion therein, rotation of the crankshaft fluctuates in synchronization with the combustion cycle of the engine. If the rotor of the electric motor is directly connected to the crankshaft, the rotor rotates at a non-constant speed. This may affect operation and control of the electric motor. In consideration of this, in the hybrid vehicle thus configured, a low-rigid torsional damper is interposed between the crankshaft and the rotor of the electric motor. Thus, the torsional damper functions to avoid direct transmissions of the rotational fluctuation of the crankshaft to the electric motor by damping the rotational fluctuation of the crankshaft.

However, in the engine in which the low-rigid torsional damper is connected to the crankshaft, it is not possible to calculate the engine torque with sufficient accuracy based on only the information on the angular velocity of the crankshaft.

More specifically, if the torsional damper is connected to the crankshaft, torque produced by the engine is partially absorbed by torsion of the torsional damper. A torsional damper provided in a typical non-hybrid vehicle is sufficiently rigid and is regarded as substantially a rigid body. Therefore, it is possible to calculate the engine torque with sufficient accuracy even when the amount of torque absorbed by torsion of the torsional damper is not taken into account. However, because a relatively low rigid torsional damper is employed in the hybrid vehicle as described above, the amount of torque absorbed by torsion of the torsional damper becomes large to the extent that cannot be ignored. Moreover, when the torsional damper rotates, the torsional damper is repeatedly twisted and untwisted in accordance with a change of the angular velocity of the crankshaft caused by a change of an engine load, and therefore, the amount of torque absorbed by the torsion of the torsional damper significantly fluctuates as time passes. Thus, in the engine in which the low-rigid torsional damper is connected to the crankshaft, it is not possible to calculate the engine torque with sufficient accuracy based on only the information on the angular velocity of the crankshaft.

SUMMARY OF THE INVENTION

The invention provides an engine control systems that accurately calculates engine torque based on information on an angular velocity of a crankshaft, and snore appropriately controls an engine based on the result of the calculation even when a low-rigid torsional damper is connected to the crankshaft.

An engine control system according to an aspect of the invention includes: an engine that outputs a rotation of a crankshaft through a torsional damper; a calculation portion that calculates a value of engine torque based on an angular acceleration of the crankshaft and an moment of inertia of the crankshaft; and a correction portion that calculates a correction value based on a torsional angle of the torsional damper, and corrects the calculated value of the engine torque using the correction value.

According to the aforementioned aspect, the engine torque is calculated by correcting the value calculated based on the angular acceleration of the crankshaft and the moment of inertia of the crankshaft, using the correction value calculated based on the torsional angle of the torsional damper. It is possible to determine the amount of torque absorbed by torsion of the torsional damper based on the torsional angle of the torsional damper. Therefore, it is possible to calculate the engine torque taking into account the amount of torque absorbed by torsion of the torsional damper, by correcting the calculated value of the engine torque using the correction value calculated based on the torsional angle of the torsional damper. Consequently, according to the aforementioned aspect, even when the low-rigid torsional damper is connected to the crankshaft, it is possible to accurately calculate the engine torque based on the information on the angular velocity of the crankshaft, and accordingly it is possible to more appropriately control the engine based on the result of the calculation of the engine torque.

BRIEF DESCRIPTION OF THE DRAWINGS

The foregoing and/or further objects, features and advantages of the invention will become more apparent from the following description of preferred embodiment with reference to the accompanying drawings, in which like numerals are used to represent like elements and wherein.

DETAILED DESCRIPTION OF THE PREFERRED EMBODIMENTS

An embodiment of an engine control system according to the invention will be hereinafter described in detail with reference to FIGS. 1 to 6B. The control system according to the embodiment is applied to an engine mounted on a hybrid vehicle.

Figure 1:
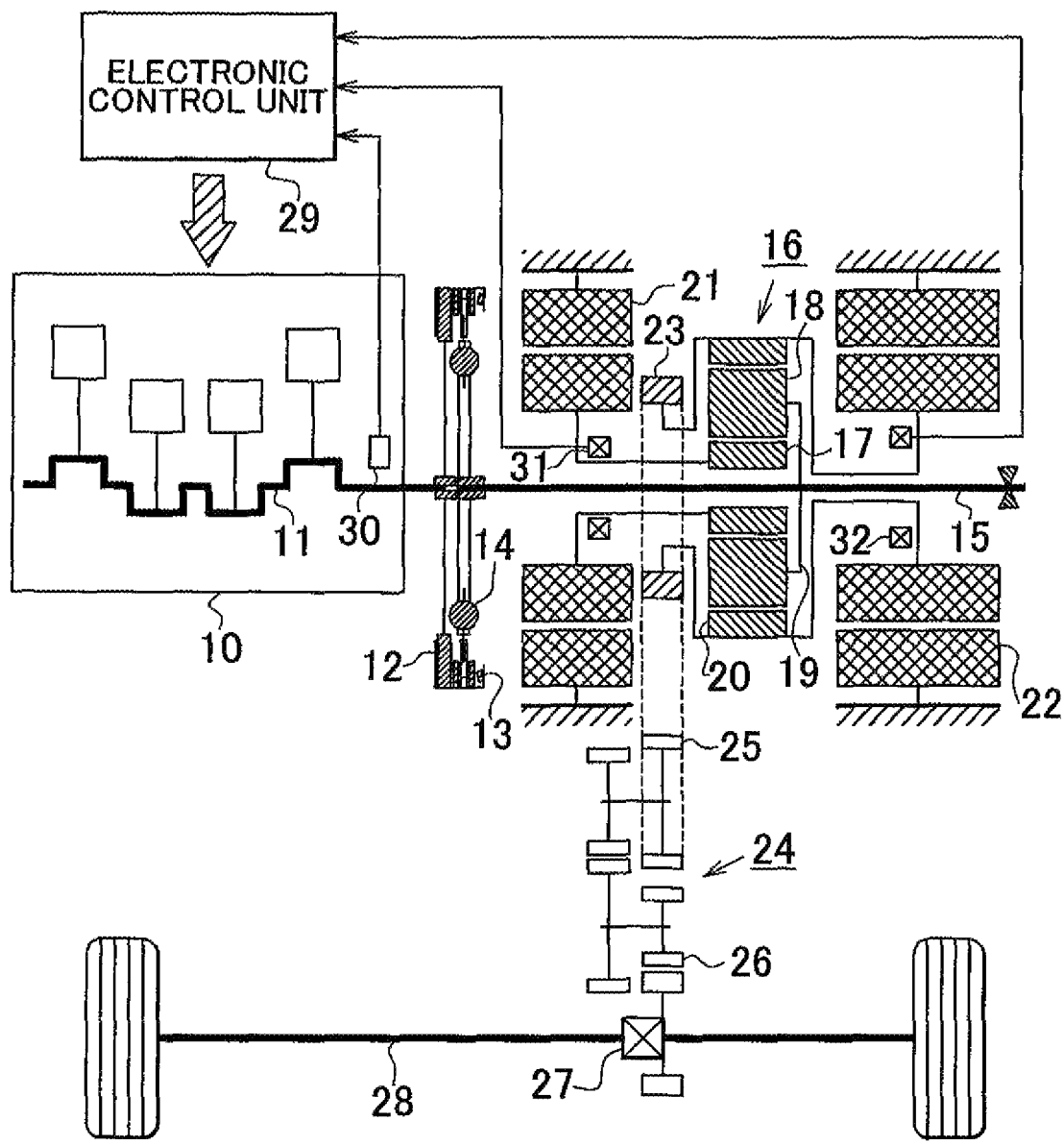
FIG. 1 schematically shows a configuration of a powertrain system of a hybrid vehicle on which an engine controlled by an engine control system according to an embodiment of the invention is mounted.

FIG. 1 shows a configuration of a powertrain system of a hybrid vehicle. As shown in FIG. 1, a flywheel 12 is connected to an end portion of a crankshaft 11 so as to integrally rotate with the crankshaft 11 that functions as an output shaft of an engine 10. The flywheel 12 is connected to an input shaft 15 through a torque limiter 13 and a torsional damper 14, and the torque limiter 13 functions as an overload protection device.

A power split mechanism 16 is provided on an outer periphery of a center portion of the input shaft 15. The power split mechanism 16 is a planetary gear mechanism including four types of following elements: a sun gear 17 provided at the center; a plurality of planetary gears 18 provided around the sun gear 17; a planetary carrier 19 that transmits revolutions of the planetary gears 18; and an outer gear 20 provided outside of the planetary gears 18. A rotor of a first motor generator (the motor generator will be hereinafter abbreviated as "MG") 21 is connected to the sun gear 17 in the power split mechanism 16 so as to integrally rotate with the sun gear 17. The input shaft 15 is connected to the planetary carrier 19 so as to integrally rotate with the planetary gear 19, and a rotor of a second MG 22 and an output gear 23 are connected to the outer gear 20 so as to integrally rotate with the outer gear 20.

The output gear 23 is connected to the outer gear 20 in the power split mechanism 16, and also operatively connected to the input gear 25 in a reduction mechanism 24 through a timing belt or a chain. The rotation input from the input gear 25 is reduced in the reduction mechanism 24 and output from an output gear 26 in the reduction mechanism 24. The output gear 26 in the reduction mechanism 24 is connected to an axle 28 through a differential 27 that allows a left wheel and a right wheel to rotate at different speeds.

The torsional damper 14 provided in the powertrain system of the hybrid vehicle functions to suppress vibration and noise caused by torsional resonance of the crankshaft 11, and to suppress fatigue breakdown. Further, the torsional damper 14 also functions to suppress transmission of rotational fluctuation of the crankshaft 11, which is caused by intermittent combustion in the engine 10, to the first MG 21 and the second MG 22. Therefore, in the hybrid vehicle, the torsional damper 14 has relatively low spring rigidity.

Further, the hybrid vehicle includes an electronic control unit 29 that performs various controls related to the engine 10. The electronic control unit 29 includes a central processing unit (CPU), a read-only memory (ROM), a random-access memory (RAM), and an input port and an output port (I/O ports). The CPU performs computations to control the engine 10, and the ROM stores control programs and data. The RAM temporarily stores the results of computations performed by the CPU, and the I/O ports are used when signals are input to the electronic control unit 29 from outside components, and signals are output from the electronic control unit 29 to outside components. The electronic control unit 29 receives, through the input port, detection signals output from sensors, such as a crank angle sensor 30 that detects a rotational angle of the crankshaft 11, a first resolver 31 that detects a rotational angle of the first MG 21, and a second resolver 32 that detects a rotational angle of the second MG 22. These sensors detect operational conditions of the engine 10 and a vehicle. Then, the electronic control unit 29 controls, for example, an intake air amount, a fuel injection amount, and an ignition timing based on the detection signals output from the sensors as described above.

In the embodiment, because the electronic control unit 29 performs controls in the manner as described above, the electronic control unit 29 constantly calculates engine torque during engine operation. How to calculate the engine torque according to the embodiment will be hereinafter described in detail.

The engine torque is basically determined as the product of an angular acceleration of the crankshaft 11 and a moment of inertia of the crankshaft 11. The angular acceleration of the crankshaft 11 may be determined based on a result of detection performed by the crank angle sensor 30, and the moment of inertia of the crankshaft 11 may be preliminarily determined as a design value. However, the method of calculating the engine torque by multiplying the angular acceleration by the moment of inertia is used only when the torsional damper 14 is regarded as a rigid body. This is because absorption of the engine torque by torsion of the elastic torsional damper 14 needs to be taken into account when calculating the engine torque if the torsional damper 14 is an elastic body. Because the torsional damper 14 in the embodiment has relatively low spring rigidity, it is not possible, due to the reason as described above, to accurately calculate the engine torque based on only the product of the angular acceleration and the moment of inertia.

Due to the reason as described above, in the embodiment, the electronic control unit 29 calculates engine torque T_q based on a torsional angle $\Delta\theta$ of the torsional damper 14, in addition to the angular acceleration ($d\omega\_e/dt$) of the crankshaft 11 and a moment of inertia I_e of the crankshaft 11. More specifically, the engine torque T_q is calculated using an equation 1 below:

$$T_q = I_e \dot{\omega}_e + T_f + K_{damp}\Delta\theta \quad (1)$$

$I_e$: Moment of inertia of the crankshaft
$\dot{\omega}_e$: Angular acceleration of the crankshaft ($=d\omega_e/dt$)
$T_f$: Friction torque
$K_{damp}$: Spring coefficient of the torsional damper
$\Delta\theta$: Torsional angle of the torsional damper The first term on the right-hand side of the equation 1 is a base value T_b for the engine torque T_q. The base value T_b is determined as the product of the angular acceleration ($d\omega\_e/dt$) of the crankshaft 11 and the moment of inertia I_e of the crankshaft 11. The second term on the right-hand side of the equation 1 is a friction correction value T_f that indicates the amount of torque absorbed by friction in sliding contact portions of the engine 10 (that is, the second term indicates friction torque). The third term on the right-hand side of the equation 1 is an elastic correction value T_e ($=K\_damp\Delta\theta$) that indicates the amount of torque absorbed by torsion of the torsional damper 14.

The friction correction value T_f in the equation 1 above is determined based on, for example, an engine speed, an engine load, and a temperature of an engine coolant. In this embodiment, the electronic control unit 29 calculates the friction correction value T_f based on a calculation map that indicates a relation between the friction correction value T_f and the engine speed, the engine load, and the temperature of the engine coolant. The calculation map is preliminarily stored in the ROM of the electronic control unit 29.

Figure 2:
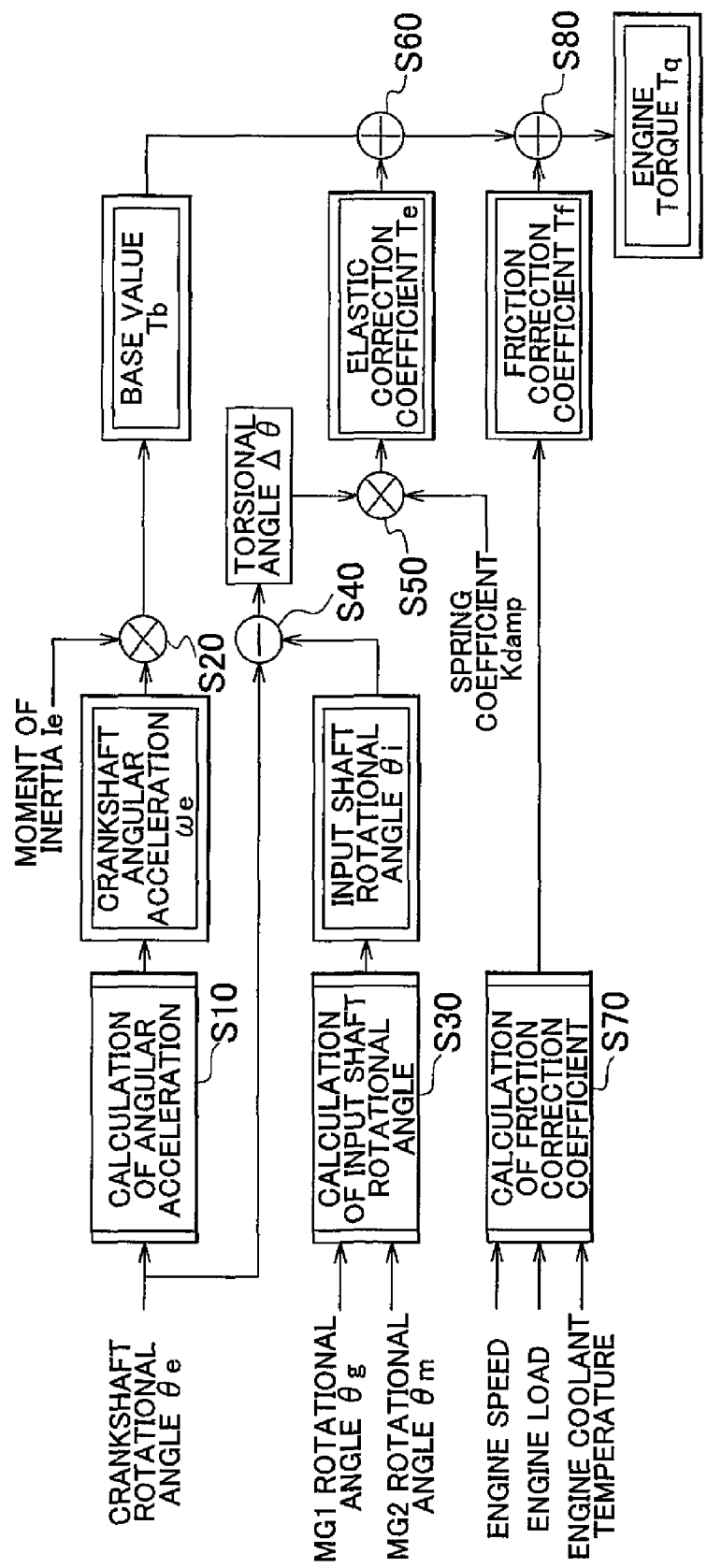
FIG. 2 is a block diagram showing an engine torque calculation logic employed in the embodiment of the invention.

The elastic correction value T_e in the equation 1 above is calculated as the product of the torsional angle Δθ and a spring coefficient K_damp of the torsional damper 14. The torsional angle Δθ of the torsional damper 14 is determined as the difference (θ_e−θ_i) between a rotational angle θ_e of the crankshaft 11 and a rotational angle θ_i of the input shaft 15. That is, the torsional angle Δθ of the torsional damper 14 is determined by subtracting the rotational angle θ_i of the input shaft 15 from the rotational angle θ_e of the crankshaft 11. The rotational angle θ_e of the crankshaft 11 is determined based on the result of the detection performed by the crank angle sensor 30. The rotational angle θ_i of the input shaft 15 is determined based on the rotational angle θ_g of the first MG 21 detected by the first resolver 31, and the rotational angle θ_m of the second MG 22 detected by the second resolver 32, in accordance with an equation 2 below.

$$\theta_i = \frac{\rho}{1+\rho} \times \theta_g + \frac{1}{1+\rho} \times \theta_m \qquad (2)$$

θ_i: Rotational angle of the input shaft
θ_g: Rotational angle of the first MG
θ_m: Rotational angle of the second MG
ρ: Planetary gear ratio FIG. 2 shows a logic of calculation of the engine torque T_q performed by the electronic control unit 29. The electronic control unit 29 repeatedly performs, as a regular time interrupt process, a process of calculating the engine torque T_q based on the logic shown in FIG. 2 at predetermined intervals during the operation of the engine 10.

In the calculation logic shown in FIG. 2, the electronic control unit 29 calculates the angular acceleration (dω_e/dt) of the crankshaft 11 based on the rotational angle θ_e of the crankshaft 11 detected by the crank angle sensor 30 (S10). Then, the electronic control unit 29 calculates the base value T_b as the product of the angular acceleration (dω_e/dt) of the crankshaft 11 calculated in S10 and the moment of inertia I_e of the crankshaft 11 (S20).

Further, the electronic control unit 29 calculates the rotational angle θ_i of the input shaft 15 based on the rotational angle θ_g of the first MG 21 detected by the first resolver 31 and the rotational angle θ_m of the second MG 22 detected by the second resolver 32 (S30). The electronic control unit 29 also calculates the torsional angle Δθ of the torsional damper 14 as the difference between the rotational angle θ_e of the crankshaft 11 and the rotational angle θ_i of the input shaft 15 (θ_e−θ_i). That is, the electronic control unit 29 calculates the torsional angle Δθ of the torsional damper 14 by subtracting the rotational angle θ_i of the input shaft 15 from the rotational angle θ_e of the crankshaft 11 (S40). The electronic control unit 29 calculates the elastic correction value T_e for the engine torque T_q as the product of the calculated torsional angle Δθ and the spring coefficient K_damp of the torsional damper 14 (S50). The electronic control unit 29 adds the product determined in S50 to the base value T_b (S60). Further, the electronic control unit 29 calculates the friction coefficient value T_f based on the detected engine speed, the detected engine load, and the detected temperature of the engine coolant, using the calculation map M1 (S70).

The electronic control unit 29 adds the friction coefficient value T_f calculated in S70 to the sum of the base value T_b and the elastic correction value T_e (S80). In this way, the engine torque T_q is calculated. In the embodiment, the processes in S30 to S60 in the logic of the calculation of the engine torque T_q may be regarded as the processes performed by a correction portion according to the invention.

Figure 3:
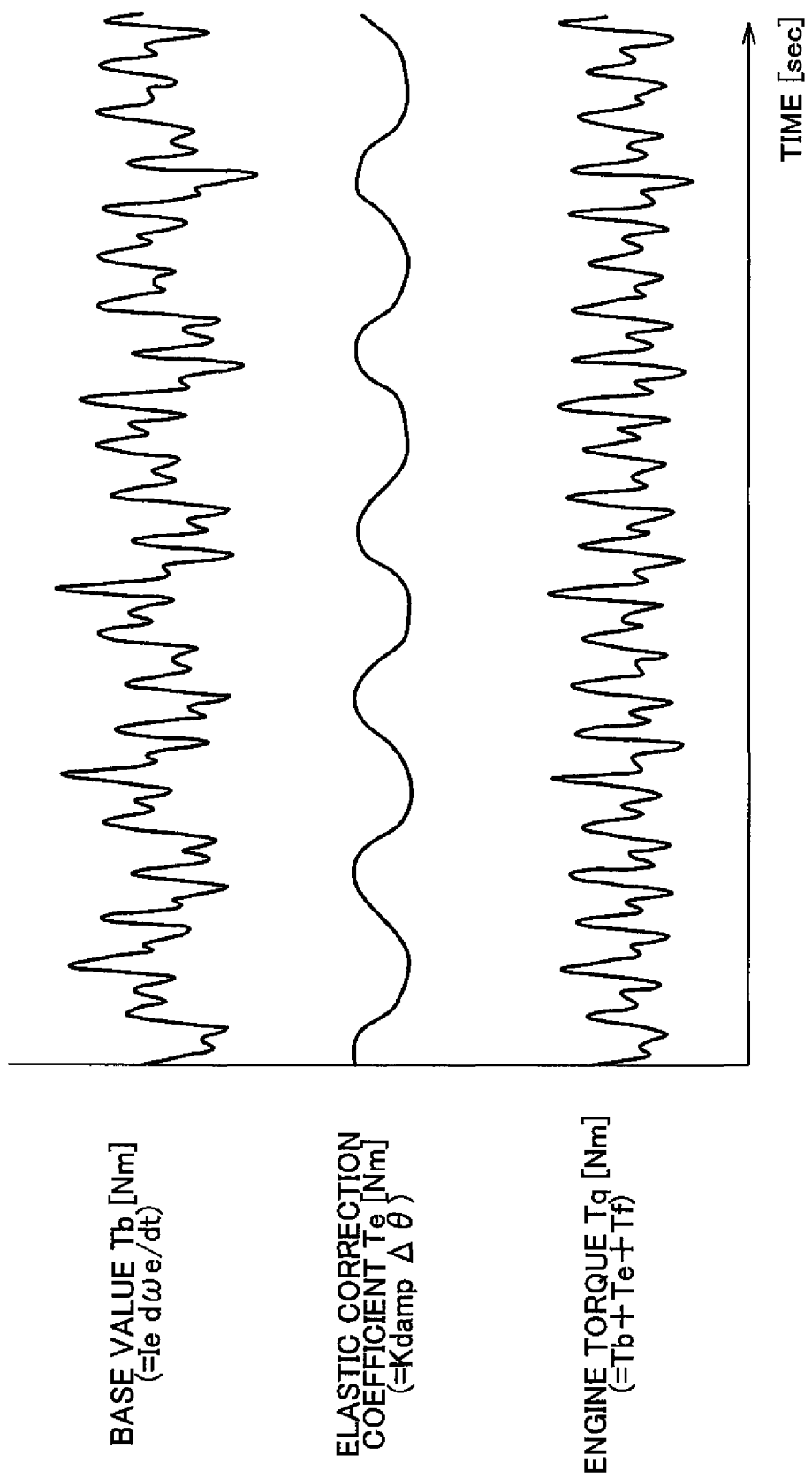
FIG. 3 is a time chart showing an example in which a base value, an elastic correction coefficient, and engine torque are calculated according to the engine torque calculation logic employed in the embodiment of the invention.

FIG. 3 shows an example of the base value T_b for the engine torque T_q, an example of the elastic correction value T_e for the engine torque T_q, and an example of the result of the calculation of the engine torque T_q. The elastic correction value T_e determined as the product of the torsional angle Δθ and the spring coefficient K_damp of the torsional damper 14 indicates the amount of the engine torque absorbed by torsion of the torsional damper 14. The correction using the elastic correction value T_e as described above makes it possible to calculate the engine torque T_q taking into account the amount of torque absorbed by torsion of the torsional damper 14. Thus, it is possible to accurately calculate the engine torque T_q even when the low-rigid torsional damper 14 is connected to the crankshaft 11.

Next, the method of extracting a specific frequency component from the result of the above-described calculation of the engine torque T_q will be described. The waveform showing the fluctuation of the engine torque includes various frequency components. If the strength of the component whose frequency matches a resonant frequency (for example, 1 to 4 Hz) of a vehicle, among all the frequency components, is increased, an occupant in the vehicle is more likely to feel discomfort. In order to evaluate the level of discomfort of the occupant, it is necessary to extract the specific frequency component from the result of the calculation of the engine torque T_q.

In the embodiment, the specific frequency component of the engine torque T_q is extracted by taking an average of the calculated values of the engine torque T_q over a predetermined time period. If the average of the calculated values are taken over the predetermined time period, the frequency components with a shorter cycle than the predetermined time period are made uniform, and therefore, the averaged value taken over the predetermined time period is equivalent to the value determined by applying a low-pass filter to the result of the calculation of the engine torque T_q. Further, if the average of the calculated values is taken over each of two different predetermined time periods so as to determine the difference between the determined two averages, the difference is equivalent to the value determined by applying a band-pass filter to the result of the calculation of the engine torque T_q. Thus, it is possible to easily extract the specific frequency component of the engine torque T_q by taking the average of the calculated values over the predetermined time period, or by taking the averages of the calculated values over the different predetermined time periods, and calculating the difference between the averages taken over the different predetermined time periods.

If the specific frequency component is extracted only when the engine 10 is operated under a predetermined operating condition that allows the engine speed to be substantially constant, for example, when the engine 10 is idling, it is also possible to extract the specific frequency component by taking the average of the calculated values of the engine torque T_q over a predetermined number of combustion events. In other words, if the engine speed is constant, the time required for performing a predetermined number of the combustion events is also constant. Therefore, it is possible to extract the specific frequency component by taking the average of the calculated values over the predetermined number of the combustion events, as well as by taking the average of the calculated values over the predetermined time period. Consequently, it is possible to extract the specific frequency component of the engine torque T_q based on the average of the calculated values of the engine torque T_q taken over the predetermined number of the combustion events at a predetermined engine speed.

Figure 4:
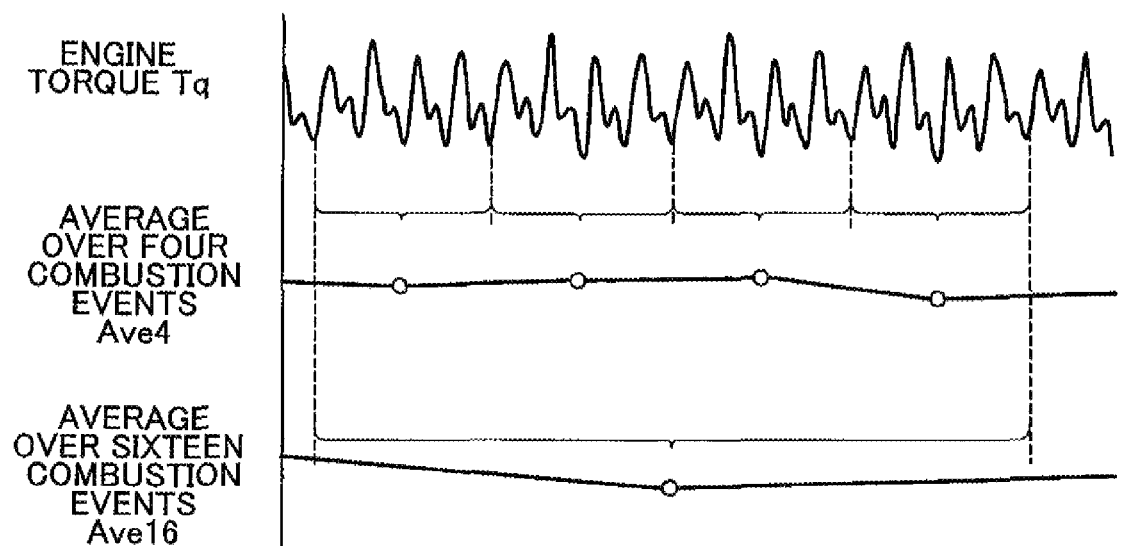
FIG. 4 is a time chart showing an example in which a specific frequency component of the engine torque is calculated according to the embodiment of the invention.
Figure 5:
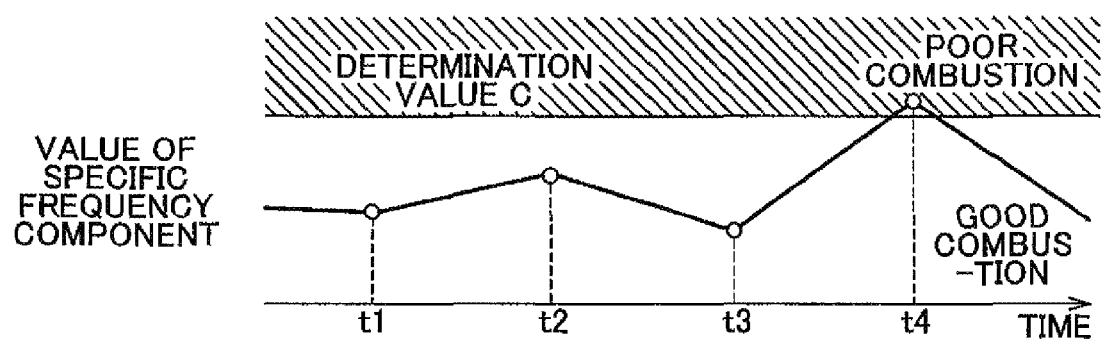
FIG. 5 is a time chart showing an example in which it is determined whether a combustion state is good according to the embodiment of the invention.
Figure 6A:
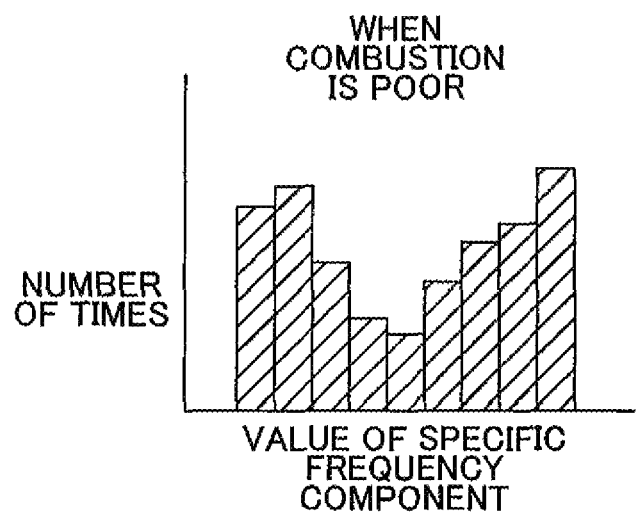
FIG. 6A is a graph showing an example of a distribution of values of the specific frequency component of the engine torque when combustion is poor.
Figure 6B:
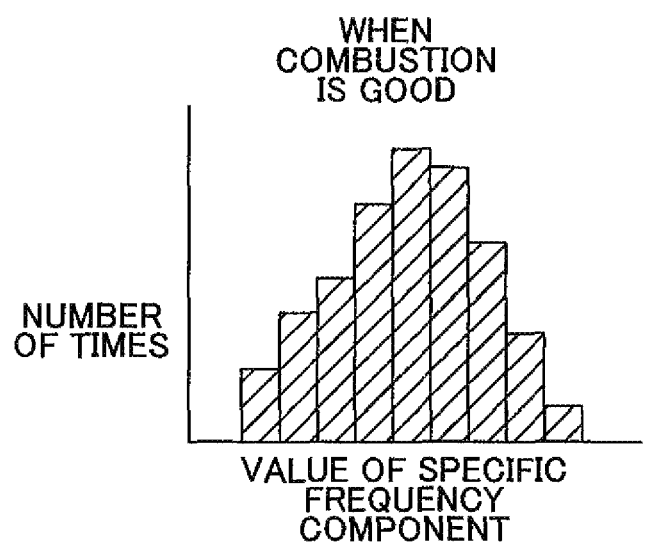
FIG. 6B is a graph showing an example of a distribution of the values of the specific frequency component of the engine torque when the combustion is good.

FIG. 4 shows the case where the average of the calculated values of the engine torque T_q is taken over four combustion events, and the case where the average of the calculated values of the engine torque T_q is taken over sixteen combustion events. For example, frequency components whose frequencies are equal to or lower than 4 Hz are extracted by taking the average of the calculated values of the engine torque T_q over four combustion events (hereinafter, the average will be referred to as "Ave 4"). Further, frequency components whose frequencies are equal to or lower than 1 Hz are extracted by taking the average of the calculated values of the engine torque T_q over sixteen combustion events (the average will be hereinafter referred to as "Ave 16"). Thus, it is possible to extract frequency components whose frequencies are in a range of 1 to 4 Hz, by determining the difference between Ave 4 and Ave 16.

Note that, the specific frequency component may be extracted by applying a digital filter processing, such as a low-pass filter and a band-pass filter, to the calculated values of the engine torque T_q. However, the specific frequency component is more easily extracted by calculating the averages as described above, compared to when the specific frequency component is extracted by applying the digital filter processing to the calculated values of the engine torque T_q.

The specific frequency component of the engine torque thus extracted may be used for a determination as to whether a combustion state in the engine 10 is good. The determination may be made, for example, in any one of three determination modes as described below, or in at least two of the three determination modes, which are combined.

In a first determination mode, it is determined whether the combustion state in the engine 10 is good directly based on a value of the extracted specific frequency component of the engine torque. If the combustion state is deteriorated, and accordingly, fluctuation of the engine torque is large, the value of each frequency component of the engine torque becomes large. Therefore, it is possible to determine whether the combustion state is good based on a determination as to whether the value of the extracted specific frequency component is equal to or smaller than a determination value C, which is preliminarily determined. In an example shown in FIG. 5, the value of the specific frequency component of the engine torque extracted at each of time t1, t2, t3 is smaller than the determination value C, and thus, it is determined that the combustion state is good. However, the value of the specific frequency component of the engine torque extracted at time t4 exceeds the determination value C, and therefore, it is determined that the combustion state is deteriorated, at time t4.

Next, in a second determination mode, it is determined whether the combustion state in the engine 10 is good based on a distribution of the values of the extracted specific frequency component of the engine torque. If the good combustion state is maintained, the values of the specific frequency component of the engine torque are distributed in a pattern that is close to the normal distribution pattern. On the other hand, if the combustion state is deteriorated, the variation of the value of the specific frequency component becomes large, and the distribution pattern of the values is deviated from the normal distribution pattern. Thus, the number of times that the value of the extracted specific frequency component falls in each predetermined range is counted. When the total count number reaches a predetermined number, it is determined whether the values of the specific frequency component are distributed in a pattern close to the normal distribution pattern. In this manner, it is possible to whether the combustion state is good. For example, in an example shown in FIG. 6A, the values of the specific frequency component of the engine torque are distributed in the non-normal distribution pattern, and therefore, it is determined that the combustion state is poor. Further, in an example shown in FIG. 6B, the values of the specific frequency component of the engine torque are distributed in a pattern that substantially matches the normal distribution pattern, and therefore, it is determined that the combustion state is good.

In a third determination mode, it is determined whether the combustion state in the engine 10 is good based on an average of the values of the extracted specific frequency component of the engine torque. More specifically, the average of the values of the extracted specific frequency component of the engine torque is taken over a predetermined time period or over a predetermined number of the combustion events, and it is determined whether the combustion state is good based on whether the average is equal to or smaller than a predetermined value. Further, if the degree of variation of the value of the specific frequency component is evaluated, a standard deviation may be determined, or an average of absolute values of the specific frequency component may be determined, instead of simply determining the average of the values of the specific frequency component.

The determination result obtained in the manner as described above is fed back to the engine control. In other words, the electronic control unit 29 controls engine control variables, such as an intake air amount, a fuel injection amount, and ignition timing, through feedback, based on the determination result obtained in the manner as described above so that the good combustion state is maintained in the engine 10. More specifically, when it is determined that the combustion state is poor in the aforementioned determination process, the electronic control unit 29 adjusts the intake air amount by adjusting a throttle opening and valve timing, and also adjusts the amount of fuel injected from an injector, to change an air-fuel ratio to the value at which the combustion state is improved. Further, the electronic control unit 29 also retards the ignition timing. As described herein, the result of the calculation of the engine torque T_q obtained in the embodiment may be used for the feedback control of the engine control variables to maintain the good combustion state.

The result of the calculation of the engine torque T_q obtained in the embodiment may be used for reducing the variation of generated torque among the cylinders, which is caused by the variation of combustion among the cylinders. It is possible to determine torque generated due to the combustion in each cylinder of the engine 10 based on the result of the calculation of the engine torque T_q described above. In other words, it is possible to estimate strength of the combustion (magnitude of torque) in each cylinder by comparing the values of the engine torque. T_q determined during combustion strokes of the cylinders. Thus, it is possible to reduce the difference in the combustion strength among the cylinders by separately controlling the engine control variables for each cylinder through feedback based on the estimation result. For example, the feedback control is performed for a cylinder in which the combustion is determined to be strong so that the fuel injection amount is reduced and the ignition timing is retarded in order to reduce the torque generated in the cylinder. On the other hand, the feedback control is performed for a cylinder in which the combustion is determined to be weak so that the fuel injection amount is increased and the ignition timing is advanced in order to increase the torque generated in the cylinder. If it is possible to separately control the intake air amount for each cylinder, for example, in an engine provided with a mechanism that adjusts the intake air amount by adjusting a valve lift of an intake valve, it is possible to reduce the variation of the generated torque among the cylinders by adjusting the intake air amount for each cylinder.

Further, the variation of the generated torque among the cylinders, which is caused by a poor combustion state in at least one of the cylinders, may be reduced by identifying the cylinder(s) in which the combustion state is poor, and improving the combustion state in the cylinder(s). In this case, the cylinder in which the combustion state is poor is identified by determining whether the combustion state is good in each cylinder, in at least one of the first to third determination modes as described above. Then, the variation of the generated torque among the cylinders is reduced by appropriately changing the intake air amount, the fuel injection amount, the ignition timing, and the like for the cylinder in which the combustion state is determined to be poor, to improve the combustion state in the cylinder.

Note that, in the embodiment, the processes performed by an extraction portion according to the invention, the processes performed by a determination portion according to the invention, and the processes performed by a feedback control portion according to the invention are performed by the electronic control unit 29.

According to the engine control system in the embodiment as described above, the following advantageous effects are achieved. As a first effect, in the embodiment, when the engine torque T_q is calculated based on the angular acceleration and the moment of inertia of the crankshaft 11, the calculated value of the engine torque is corrected using the elastic correction value T_e calculated based on the torsional angle of the torsional damper 14. More specifically, the calculated value of the engine torque is corrected using the elastic correction value T_e calculated as the product of the torsional angle $\Delta\theta$ and the spring coefficient K_damp of the torsional damper 14. Note that, it is possible to determine the amount of torque absorbed by torsion of the torsional damper 14 based on the torsional angle $\Delta\theta$ of the torsional damper 14. If the torsional damper 14 is regarded as a simple spring element, the amount of torque absorbed by torsion of the torsional damper 14 is calculated as the product of the torsional angle $\Delta\theta$ and the spring coefficient K_damp of the torsional damper 14. Therefore, if the calculated value of the engine torque is corrected using the elastic correction value T_e thus calculated, it is possible to calculate the engine torque taking into account the amount of torque absorbed by torsion of the torsional damper 14. Further, eyes when the low-rigid torsional damper 14 is connected to the crankshaft 11, it is possible to accurately calculate the engine torque based on information on the angular velocity of the crankshaft 11, and to more appropriately perform the engine control based on the result of the calculation of the engine torque.

As a second effect, in the engine control system according to the embodiment, the specific frequency component of the engine torque is extracted based on the average of the calculated values of the engine torque T_q taken over the predetermined time period or the predetermined number of the combustion events. The average is equivalent to the value determined by applying the low-pass filter to the result of the calculation of the engine torque. Thus, it is possible to easily extract the specific frequency component of the engine torque by calculating the above-described average. Further, it is also possible to extract the specific frequency component of the engine torque based on the difference between the averages of the calculated values taken over two different predetermined time periods or over two different numbers of combustion events. The difference between the averages is equivalent to the value determined by applying the band-pass filter to the result of the calculation of the engine torque. Therefore, it is possible to easily extract the specific frequency component of the engine torque by calculating the aforementioned difference of the averages.

As a third effect, in the engine control system according to the embodiment, it is determined whether the combustion state in the engine 10 is good based on the value of the specific frequency component of the engine torque extracted in the manner as described above, the distribution of the values of the specific frequency component, or the average of the values of the specific frequency component. Therefore, it is possible to easily and accurately check the combustion state in the engine 10.

As a fourth effect, in the engine control system according to the embodiment, the control variables of the engine 10, such as the intake air amount, the fuel injection amount, and the ignition timing, are controlled through feedback based on the result of the determination as to whether the combustion state is good, which is performed in the manner as described above. This makes it possible to easily and accurately maintain the good combustion state in the engine 10.

As a fifth effect, in the engine control system according to the embodiment, the specific frequency component of the engine torque is extracted separately for each cylinder of the engine 10. If the specific frequency component of the engine torque is extracted separately for each cylinder, it is possible to separately check the combustion and the generation of the torque in each cylinder of the engine 10. Further, it is possible to separately determine whether the combustion state in each cylinder of the engine 10 is good. More specifically, it is possible to separately determine whether the combustion state in each cylinder is good, based on the value of the specific frequency component of the engine torque, which is extracted for the cylinder, or the distribution or average of the values of the specific frequency component extracted for the cylinder.

As a sixth effect, in the engine control system according to the embodiment, the control variables of the engine 10, such as the intake air amount, the fuel injection amount, and the ignition timing, are controlled through feedback separately for each cylinder based on the result of the determination as to whether the combustion state in the cylinder is good, which is performed in the manner as described above, in order to maintain the good combustion state in the cylinder. This makes it possible to appropriately reduce the variation of the generated torque among the cylinders, which is caused by a poor combustion state in at least one of the cylinders.

The aforementioned embodiment may be modified as described below. When a damping coefficient of the torsional damper 14 is larger than a certain value, the amount of torque absorbed by the torsional damper 14 needs to be calculated taking into account the aspect of the torsional damper 14 that functions as a damping element, in addition to the aspect of the torsional damper 14 that functions as a spring element. Therefore, in this case, the engine torque T_q is calculated using an equation 3 below.

$$T_q = I_e \dot{\omega}_e + T_f + K_{damp}(\theta_e - \theta_i) + C_{damp}(\omega_e - \omega_i) \qquad (3)$$

$C_{damp}$: Damping coefficient of the torsional damper
$\omega_e$: Angular velocity on an output side of the torsional damper $\omega_i$: Angular velocity on an input side of the torsional damper The fourth term on the right-hand side of the equation 3 above functions as a damping correction term that indicates the amount of torque absorbed by a damping action of the torsional damper 14. The damping correction term is expressed by the product of the damping coefficient C_damp of the torsional damper 14 and a difference ($\omega\_e-\omega\_i$) between the angular velocity on one side (that is, an output side in this embodiment) of the torsional damper 14 and the angular velocity on the other side (that is, an input side in this embodiment) of the torsional damper 14 (the difference will be hereinafter simply referred to as "angular velocity difference"). When the engine torque T_q is calculated according to the equation 3, the calculated value of the engine torque is corrected using a correction value determined as the sum of the product of the torsional angle $\Delta\theta$ and the spring coefficient K_damp of the torsional damper 14 and the product of the angular velocity difference ($\omega\_e-\omega\_i$) and the damping coefficient C_damp of the torsional damper 14.

Further, the aforementioned embodiment may be modified as described below. In the embodiment above, when the engine torque T_q is calculated, the calculated value of the engine torque is corrected using the friction correction value T_f calculated based on the temperature of the engine coolant and the engine speed. However, if a change of the friction torque due to the temperature of the engine coolant and the engine speed is sufficiently small, the engine torque T_q may be calculated using the friction correction value T_f that is set to a constant value. Further, if the friction torque is negligible, the correction using the friction correction value T_f may be omitted when the engine torque T_q is calculated.

In the embodiment according to the invention, the invention is embodied as a control system for the engine that is mounted on a hybrid vehicle in which the crankshaft 11 is connected to a rotor of the motor-generator (MG) through the torsional damper 14. However, in addition to the engine for a hybrid vehicle, the control system according to the invention may be applied to any engine in a similar or identical manner, as long as the engine is configured to output the rotation of the crankshaft through the low-rigid torsional damper. When the control system according to the invention is applied, it is possible to accurately calculate the engine torque based on information of the angular velocity of the crankshaft 11, regardless of the amount of torque absorbed by torsion of the torsional damper connected to the crankshaft. Thus, it is possible to more appropriately perform the engine control based on the calculation result thus obtained.

While the invention has been described with reference to example embodiments thereof, it should be understood that the invention is not limited to the example embodiments or constructions. To the contrary, the invention is intended to cover various modifications and equivalent arrangements. In addition, while the various elements of the example embodiments are shown in various combinations and configurations, which are example, other combinations and configurations, including more, less or only a single element, are also within the spirit and scope of the invention.

What is claimed is:

1. An engine control system, comprising:
   an engine that outputs a rotation of a crankshaft through a torsional damper;
   a calculation portion that calculates a value of engine torque based on an angular acceleration of the crankshaft and a moment of inertia of the crankshaft; and
   a correction portion that calculates a correction value based on a torsional angle of the torsional damper, and corrects the calculated value of the engine torque using the correction value.

2. The engine control system according to claim 1, wherein the correction value is calculated as a product of the torsional angle and a spring coefficient of the torsional damper.

3. The engine control system according to claim 1, wherein the correction value is calculated as a sum of a product of the torsional angle and a spring coefficient of the torsional damper, and a product of a damping coefficient of the torsional damper and a difference between an angular velocity on one side of the torsional damper and an angular velocity on the other side of the torsional damper.

4. The engine control system according to claim 1, further comprising an extraction portion that extracts a specific frequency component of the engine torque based on an average of the calculated value of the engine torque, which has been corrected by the correction portion, wherein the average is taken over a predetermined time period.

5. The engine control system according to claim 4, wherein the extraction portion calculates the average over each of two different predetermined time periods, and extracts the specific frequency component of the engine torque based on a difference between the averages over the two different predetermined time periods.

6. The engine control system according to claim 1, further comprising an extraction portion that extracts a specific frequency component of the engine torque based on an average of the calculated value of the engine torque, which has been corrected by the correction portion, wherein the average is taken over a predetermined number of combustion events at a predetermined engine speed.

7. The engine control system according to claim 6, wherein the extraction portion calculates the average over each of two different numbers of the combustion events, and extracts the specific frequency component of the engine torque based on a difference between the averages over the two different numbers of the combustion events.

8. The engine control system according to claim 1, further comprising an extraction portion that extracts a specific frequency component of the engine torque by applying a digital filter processing to the calculated value of the engine torque, which has been corrected by the correction portion.

9. The engine control system according to claim 4, further comprising a determination portion that determines whether a combustion state in the engine is good based on a value of the specific frequency component of the engine torque extracted by the extraction portion.

10. The engine control system according to claim 4, further comprising a determination portion that determines whether a combustion state in the engine is good based on a distribution of a value of the specific frequency component of the engine torque extracted by the extraction portion.

11. The engine control system according to claim 4, further comprising a determination portion that determines whether a combustion state in the engine is good based on an average of a value of the specific frequency component of the engine torque extracted by the extraction portion.

12. The engine control system according to claim 9, further comprising a feedback control portion that controls an engine control variable through feedback based on a determination result obtained by the determination portion so that a good combustion state is maintained in the engine.

13. The engine control system according to claim 4, wherein the extraction portion extracts the specific frequency component of the engine torque for each of cylinders of the engine.

14. The engine control system according to claim 13, further comprising a determination portion that separately determines whether the combustion state in each of the cylinders of the engine is good based on a value of the specific frequency component of the engine torque extracted for the cylinder by the extraction portion.

15. The engine control system according to claim 13, further comprising a determination portion that separately determines whether the combustion state in each of the cylinders of the engine is good based on a distribution of a value of the specific frequency component of the engine torque extracted for the cylinder by the extraction portion.

16. The engine control system according to claim 13, further comprising a determination portion that separately determines whether the combustion state in each of the cylinders of the engine is good based on an average of a value of the specific frequency component of the engine torque extracted for the cylinder by the extraction portion.

17. The engine control system according to claim 14, further comprising a feedback control portion that separately controls an engine control variable through feedback for each of the cylinders based on a determination result obtained by the determination portion so that a good combustion state is maintained in each of the cylinders.

18. The engine control system according to claim 1, wherein the crankshaft is connected to a rotor of an electric motor through the torsional damper.

19. The engine control system according to claim 18, wherein the torsional damper has rigidity low enough to suppress transmission of rotational fluctuation of the crankshaft, which is caused by intermittent combustion in the engine, to the electric motor.

20. The engine control system according to claim 1, wherein the engine control system is provided in a hybrid vehicle.

* * * * *